(12) United States Patent
Hecht

(10) Patent No.: US 8,753,045 B2
(45) Date of Patent: Jun. 17, 2014

(54) CUTTING INSERT HAVING ABUTMENT BARS AND CUTTING TOOL THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 1113 days.

(21) Appl. No.: 12/751,639

(22) Filed: Mar. 31, 2010

(65) Prior Publication Data

US 2010/0254775 A1 Oct. 7, 2010

(30) Foreign Application Priority Data

Apr. 5, 2009 (IL) .......................................... 197898

(51) Int. Cl.
*B23C 5/20* (2006.01)
(52) U.S. Cl.
CPC ....................................... *B23C 5/20* (2013.01)
USPC ................................. 407/40; 407/42; 407/113
(58) Field of Classification Search
USPC ............ 407/40, 42, 47, 48, 61, 102, 103, 113
IPC ........................................................ B23B 27/16
See application file for complete search history.

(56) References Cited

U.S. PATENT DOCUMENTS

| 6,126,366 | A | 10/2000 | Lundbald |
| 6,929,427 | B2 | 8/2005 | Satran |
| 7,073,987 | B2 | 7/2006 | Hecht |
| 7,121,769 | B2* | 10/2006 | Satran et al. ..................... 407/40 |
| 7,367,755 | B2* | 5/2008 | Wurfels et al. ................. 407/113 |
| 8,147,170 | B2* | 4/2012 | Wermeister ................... 407/113 |
| 2004/0131431 | A1 | 7/2004 | Satran |
| 2007/0248425 | A1* | 10/2007 | Andersson et al. ........... 407/113 |
| 2009/0123242 | A1 | 5/2009 | Heinloth et al. |
| 2009/0162155 | A1* | 6/2009 | Wermeister ................... 407/114 |

OTHER PUBLICATIONS

Official Action dated Apr. 18, 2012 issued in Israeli counterpart application (No. 197898).
International Search Report in PCT/IL2010/000197, dated Jan. 9, 2010.

* cited by examiner

*Primary Examiner* — Andrea Wellington
*Assistant Examiner* — Alan Snyder
(74) *Attorney, Agent, or Firm* — Womble Carlyle

(57) ABSTRACT

A cutting tool has a cutting insert secured in an insert pocket. The cutting insert has two abutment bars located on its opposing side surfaces. The abutment bars of a respective side surface have generally coplanar outer surfaces which define an imaginary plane that does not intersect any portion of the respective side surface apart from the outer surfaces. The outer surfaces of one set of abutment bars engage a major wall of the insert pocket.

21 Claims, 3 Drawing Sheets

CUTTING INSERT HAVING ABUTMENT BARS AND CUTTING TOOL THEREFOR

FIELD OF THE INVENTION

The present invention relates to a cutting insert and to a cutting tool, the cutting insert having at least two abutment bars located on at least one side surface thereof.

BACKGROUND OF THE INVENTION

Many indexable cutting inserts used for turning, milling or other metal cutting operations include one or more operative and/or non-operative surfaces having non-planar shapes, for example, having concave, convex, bent, sunken, undulating, curly, or bowed shapes, or other different non-planar shapes. The surfaces assume the non-planar shapes, for example, in order to satisfy various constraints arising from functional and geometrical requirements involved in the design of the cutting insert.

Some indexable, double-sided cutting inserts, for example, have two opposing surfaces, e.g., two opposing side surfaces having identical, non-planar shapes. When such a cutting insert is retained in an insert pocket of a cutting tool, a first of the two opposing surfaces may be a cutting surface involved in the cutting operation, for example, functioning as a rake surface, or as a clearance surface. The second, opposite surface may be uninvolved directly in the cutting operation and function as an engagement surface of the cutting insert, for example, engage a supporting wall of the insert pocket. When the cutting insert is indexed, for example, the two opposing surfaces interchange positions and thus assume one another's functionality.

However, e.g., referring to the above example of double-sided cutting inserts, in some instances functional requirements for the cutting surface differ from functional requirements for the engagement surface. Therefore, the identical shape of the two interchangeable surfaces may be appropriate, for example, for the functionality of the cutting surface, yet inappropriate for the functionality of the engagement surface. For instance, the non-planar shape of the two surfaces may provide desired clearance, cutting and/or chipping properties for the cutting surface, but at the same time provide only deteriorated engagement between the engagement surface and the supporting wall.

Additionally, for example, due to ordinary imperfections in the manufacture of the cutting insert, even the aforementioned deteriorated engagement may be achieved only through extensive grinding of a plurality of surfaces and edges of each individual cutting insert. The extensive grinding may be expensive, and additionally result in undesired peeling of a coating layer that covers the cutting insert. In addition, the geometry of some cutting inserts results, for example, in the grinding of the edges of the cutting inserts together with the respective engagement surfaces, even though grinding of the edges is not required, and even undesirable.

SUMMARY OF THE INVENTION

Some embodiments of the invention include a cutting insert and a cutting tool therefor. The cutting tool includes a cutting portion formed at an end thereof, the cutting portion including an insert pocket having a cutting insert releasably retained therein. The cutting insert comprises a peripheral surface, including at least a first side surface having at least two abutment bars.

In some embodiments, the first side surface, which may assume a generally concave shape without the bars, includes a first set of abutment bars, for example, two abutment bars, extending thereon, and protruding outwardly beyond other portions thereof. The abutment bars are integrally formed in the cutting insert so that the abutment bars and the rest of the cutting insert form a single, unitary, one-piece unit. Each abutment bar of the first set of abutment bars has a respective, generally planar outer surface, to engage a major wall of the insert pocket. The abutment bars of the first pair of abutment bars thereby provide proper engagement means for the first side surface, and thus for the cutting insert. The outer surfaces of the first pair of abutment bars may be coplanar, and define an imaginary plane that does not intersect any portion of the first side surface apart from the two outer surfaces. Thereby, in some embodiments the two outer surfaces are the only portions of the first side surface to engage the major wall, which may in turn be also planar. The two abutment bars of the first set of abutment bars may extend generally parallel to one another.

In some embodiments the cutting insert is tangential, i.e., the cutting insert is oriented in the cutting tool in such a manner that during a cutting operation on a work-piece the cutting forces are directed along a major (thicker) dimension of the cutting insert. In some of these embodiments the abutment bars may be located on different sides of the first side surface with respect to a through-bore extending through the cutting insert and opening out to the first side surface.

In some embodiments, the cutting insert is a double-sided cutting insert, having a second side surface located opposite the first side surface, wherein the second side surface may be identical to the first side surface. Accordingly, the second side surface, which may thus also assume a generally concave shape without the abutment bars, may include a second set of abutment bars extending therealong. The first side surface and the second side surface may interchange positions, for example, upon indexing of the cutting insert, resulting in engagement of the abutment bars of the second side surface with the major wall.

The abutment bars in each respective side surface, e.g., the second set of abutment bars in the second side surface, may extend not all the way to any edge of the respective side surface, e.g., of the second side surface, and protrude outwardly, for example, only to a limited extent beyond other portions of the second side surface. Therefore, the second side surface, which may be located adjacent the cutting area, may function, for example, as a clearance surface, wherein the bars of the second set of abutment bars are relieved from the work-piece being machine during the cutting operation, e.g., such that no abutment bar of the second set of abutment bars is operative in, or interferes with, any functionality of the cutting operation.

In this way, a cutting insert according to some embodiments of the invention, e.g., a double-sided cutting insert, is provided with both appropriate cutting properties and appropriate engagement means to engage the retaining insert pocket.

In some embodiments, the outer surfaces of a cutting insert according to the invention may be ground to assume their generally planar shape with relative ease and efficiency, e.g., by virtue of the outward protrusion of the abutment bars beyond other portions of the respective side surfaces. For example, a plurality of cutting inserts according to embodiments of the invention may be arranged on a single base plate, having their respective outer surfaces ground collectively, for example, in a single grinding operation, without having to unnecessarily grind also the cutting edges of the respective cutting inserts. This may overcome, for example, undesired, individual grinding of a plurality of surfaces, and edges, of each separate cutting insert.

BRIEF DESCRIPTION OF THE DRAWINGS

For a better understanding of the present invention and to show how the same may be carried out in practice, reference will now be made to the accompanying drawings, in which.

Figure 1:
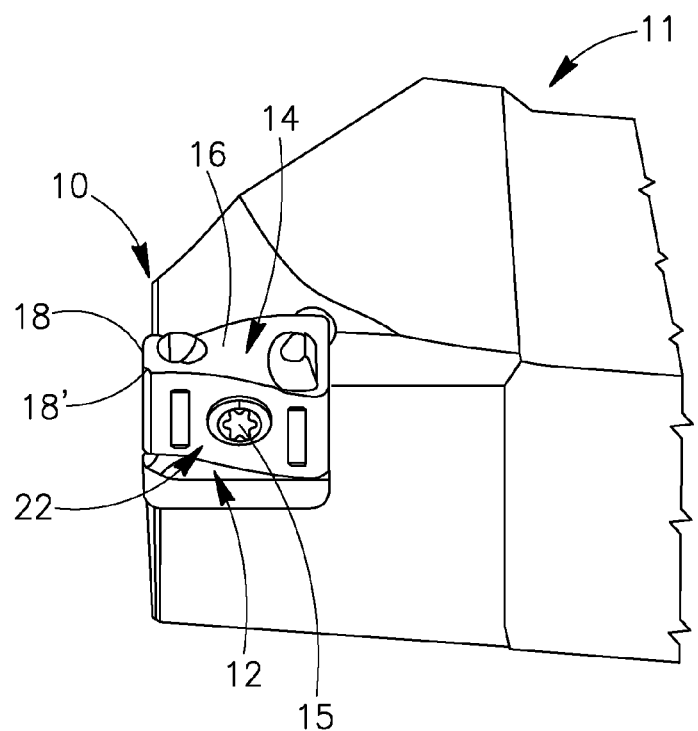
FIG. 1 is a perspective view of a cutting portion of a cutting tool, including an insert pocket having a cutting insert releasably retained therein, in accordance with some embodiments of the invention.
Figure 2:
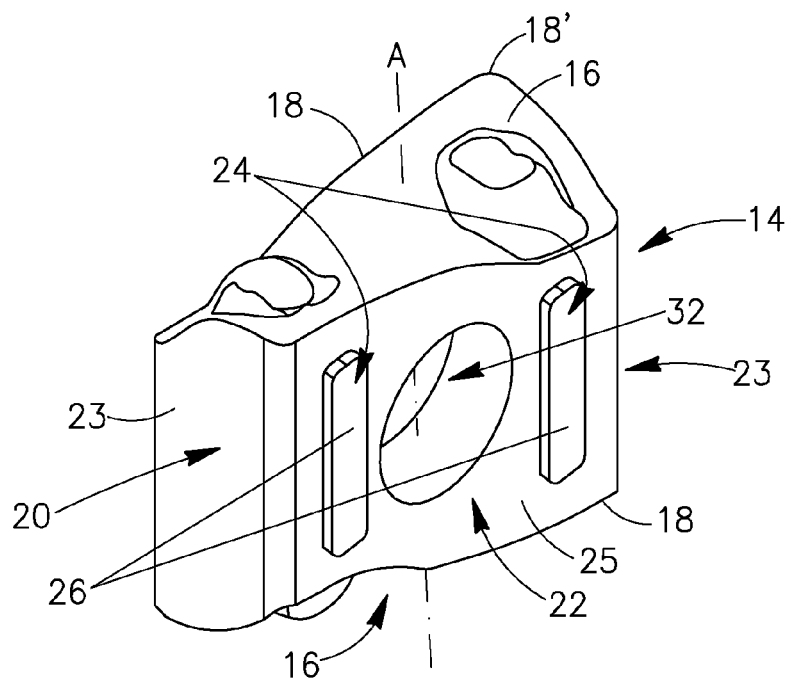
FIG. 2 is a perspective view of the cutting insert of FIG. 1, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without some of the specific details presented herein. Furthermore, well-known features may be omitted or simplified in order not to obscure the present invention.

Although some drawings herein show a turning tool, the present invention is not limited in this respect. For example, embodiments of the invention may refer to other cutting tools, e.g., to milling tools, reaming tools, parting tools, or other metal cutting tools having one or more cutting inserts releasably retained therein.

Additionally, although some drawings herein show a cutting insert having a specific shape, embodiments of the present invention are not limited in this respect. Embodiments of the invention may include, or may refer to cutting inserts having other shapes.

Also, although some drawings herein show, and/or some descriptions herein refer to one or more side surfaces of the cutting insert that assume a specific position in the cutting insert, and/or perform a specific functionality, embodiments of the invention are not limited in this respect. Accordingly, one or more side surfaces referred to herein may refer to each one of the surfaces of the cutting insert, and/or perform one or more of a plurality of functionalities associated with the cutting insert.

Reference is made to FIG. 1, showing a cutting portion 10 of a cutting tool 11, in accordance with some embodiments.

In some embodiments, the cutting portion 10 includes an insert pocket 12 which may be formed at an end of the cutting tool 11. The insert pocket 12 has a cutting insert 14, e.g., an indexable cutting insert, releasably retained therein, secured by a securing component 15. The cutting insert 14 may include two opposing end surfaces 16 and a peripheral surface 20 extending therebetween. The peripheral surface 20 may include one or more side surfaces 22 that function as a clearance surface, and/or an engagement surface, or have other functionalities. The peripheral surface 20 may additionally include one or more minor surfaces 23, for example, two opposing minor surfaces 23, wherein each minor surface 23 may extend between two opposing side surfaces 22, respectively. The peripheral surface 20 and the end surfaces 16 meet at respective edges 18, at least a section of which may form respective cutting edges 18', with a rake surface being formed on the end surface 16.

Reference is made to FIGS. 2-5, showing views of the cutting portion 10, and of components and a cross-section thereof, in accordance with some embodiments of the invention.

In some embodiments, for example, the cutting insert 14 is double-sided, such that the peripheral surface 20 includes two substantially identical, e.g., opposing, side surfaces 22, for example, a first side surface 22' and a second side surface 22". Each side surface 22 includes a plurality of abutment bars 24, e.g., two abutment bars, extending thereon, and protruding, e.g., outwardly, beyond a respective background surface 25 of the respective side surface 22. Each background surface 25 may extend around the abutment bars 24, respectively, complementing the respective side surface 22. In some embodiments, each background surface 25 assumes a generally concave shape. The abutment bars 24 on each side surface 22 are bound, for example, by the respective background surfaces 25, and do not extend along the whole of the side surfaces 22, respectively, do not intersect any of the edges 18, and consequently do not intersect any of the cutting edges 18'.

Figure 5:
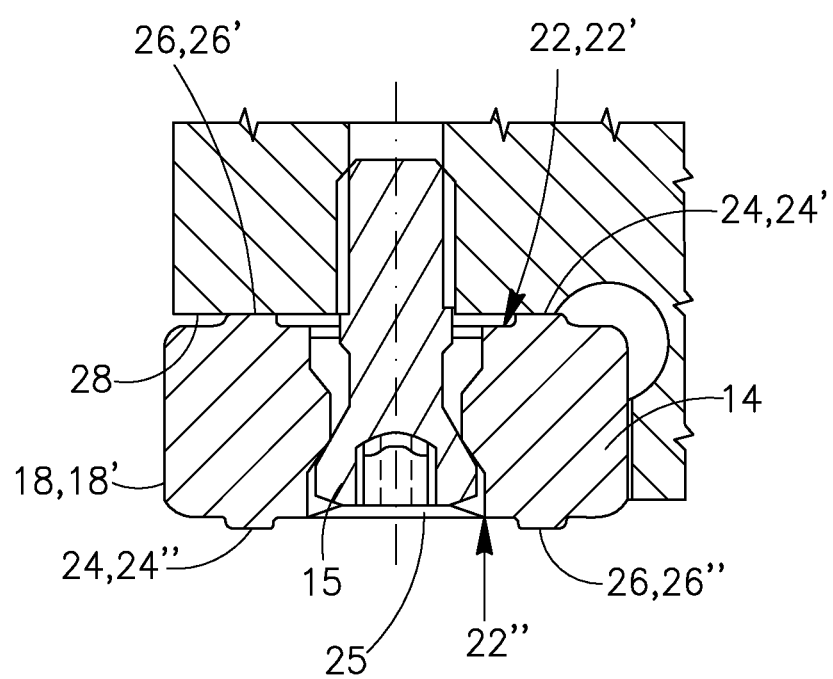
FIG. 5 is a cross-section view of the cutting portion shown in FIG. 4, taken along the line V-V in FIG. 4, in accordance with some embodiments of the invention.

Each abutment bar 24 may include a respective outer surface 26, e.g., as described in detail below. The first side surface 22' thus includes, for example, a first set of abutment bars 24', having a first set of respective outer surfaces 26', to engage a major wall 28 of the insert pocket 12, for example, upon insertion of cutting insert 14 in the insert pocket 12, e.g., as shown in FIG. 5, and as described in detail below.

The second side surface 22" may accordingly include a second set of abutment bars 24", e.g., identical to the first set of abutment bars 24'. Upon indexing of the cutting insert 14, for example, the first side surface 22' and second side surface 22" interchange positions. As described above, the one or more abutment bars 24 on each respective side surface 22 may not extend all the way to any edge 18 associated with the respective side surface 22 and so are spaced apart therefrom. In addition, the abutment bars 24 may protrude outwardly only to a limited, predefined extent beyond the respective background surfaces 25. This may provide, for example, sufficient clearance during a cutting operation between the second set of abutment bars 24", which are not in engagement with the major wall 28, and a work-piece being machined. Thus, during the cutting operation, the one or more abutment bars of the second set of abutment bars 24" are relieved from the work-piece, and neither participate nor interfere, for example, with any functionality of the cutting operation.

Figure 3:
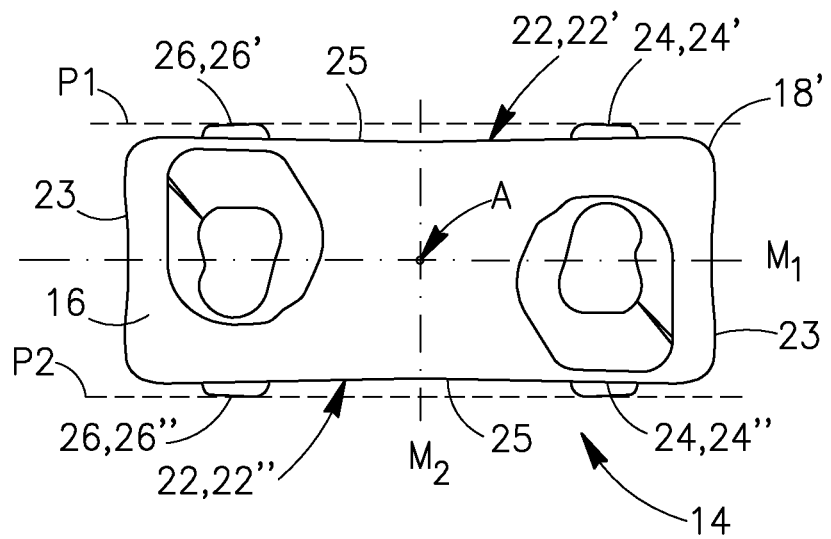
FIG. 3 is a top view of the cutting insert of FIG. 1, in which an imaginary plane has been included on a first side surface and an imaginary plane P2 has been included on a second side surface.
Figure 4:
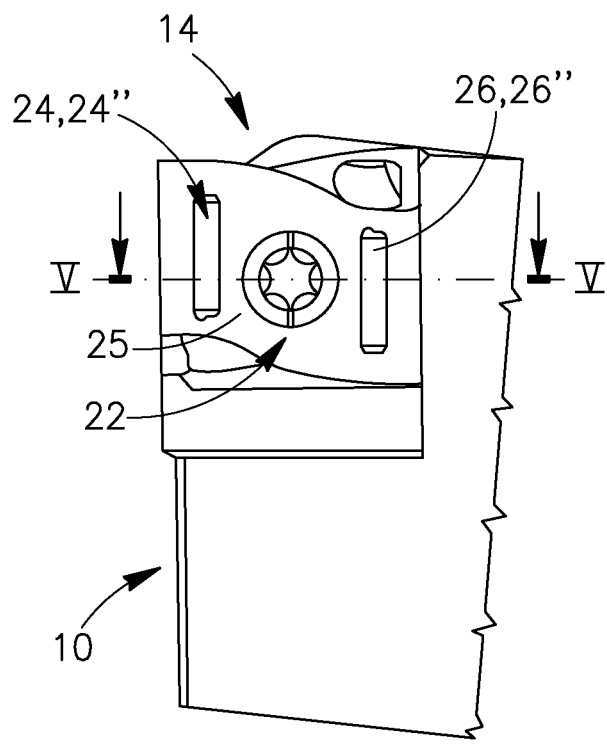
FIG. 4 is a side view of the cutting portion of FIG. 1, in accordance with some embodiments of the invention.

In some embodiments, the set of outer surfaces 26 of each respective set of abutment bars 24, e.g., the first set of outer surfaces 26', may be generally planar, in order to provide planar, surface engagement with the major wall 28. The major wall 28 may assume a complementary, substantially planar shape, to provide planar, surface engagement with the first set of outer surfaces 26'. The outer surfaces of the first set of outer surfaces 26', for example, may be coplanar, and define a first imaginary plane P1, wherein the first imaginary plane P1 does not intersect other portions of the first side surface 22', for example, since the first set of abutment bars 24' protrudes outwardly with respect to the background surface 25 of the first side surface 22', e.g., as shown in FIG. 3. Therefore, when the cutting insert 14 is secured in the insert pocket 12, the outer surfaces of the first set of outer surfaces 26' are the only portions of the first side surface 22' to engage the major wall 28, e.g., as shown in FIG. 5. It is understood that the second set of outer surfaces 26" defines a second imaginary plane P2 which is parallel to the first imaginary plane P1. Also, as seen in FIG. 3, in an end view, the entire cutting insert 14 is located between the imaginary planes.

In some embodiments, e.g., as shown in FIG. 3, a first median plane M1 extends through the two end surfaces 16 and through the two minor surfaces 23, the first median plane M1 extending, for example, parallel to the first imaginary plane P1. A second median plane M2 may extend through the first and second side surfaces 22 and through the two end surfaces 16, the second median plane M2 extending, for example, substantially transverse to the first median plane M1. The intersection of the first median plane M1 and the second median plane M2 defines an axis A, e.g., shown in FIG. 2. In some embodiments, the abutment bars 24 assume an elongated shape. In some of these embodiments, for example, the abutment bars 24 extend substantially parallel to one another, and generally parallel, for example, to the axis A. In other embodiments the bars 24 may assume other, non-elongated shapes.

In some embodiments, the cutting insert 14 is tangential. In some of these embodiments, for example, a through-bore 32, extending through the cutting insert 14, for receiving the securing component 15 therein, may open out to both the side surfaces 22, wherein the second median plane M2 may substantially halve the through-bore 32. The first set of abutment bars 24' may thereby include two abutment bars 24, located on opposite sides of the first side surface 22' with respect to the second median plane M2 and the through-bore 32. In some embodiments, e.g., in which the cutting insert is double-sided and tangential, each of the side surfaces 22 may be larger in area than every other surface of the cutting insert 14; for example, each of the side surfaces 22 may be larger in area than the minor surfaces 23 and the end surfaces 16, the latter of which constitute the rake surfaces of the cutting insert.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (14), comprising:
   two opposing end surfaces (16) and a peripheral surface (20) extending therebetween, the peripheral surface (20) and the end surfaces (16) meeting at respective edges (18), at least a section of which forms respective cutting edges (18') with a rake surface being formed on the end surface (16), the peripheral surface (20) comprising at least a first side surface (22'); wherein:
   the first side surface (22') comprises a first set of abutment bars (24') extending thereon and protruding outwardly with respect to a background surface (25) of the first side surface (22'), each abutment bar of the first set of abutment bars (24') comprising a respective outer surface (26') for engaging a major wall (28) of an insert pocket (12) that releasably retains the cutting insert (14) therein;
   the outer surfaces (26') are generally coplanar and define an imaginary plane (P1) that does not intersect any portion of the first side surface (22') apart from the outer surfaces (26'); and
   the abutment bars (24') are spaced apart from said respective edges (18) where the peripheral surface (20) meets the end surfaces (16).

2. The cutting insert (14) of claim 1, wherein the cutting insert (14) is double-sided, and the peripheral surface (20) comprises a second side surface (22"), located opposite the first side surface (22') and identical thereto; wherein the second side surface (22") also comprises a background surface (25).

3. The cutting insert (14) of claim 1, wherein:
   the cutting insert (14) is a tangential cutting insert (14);
   a through-bore (32) extends through the cutting insert (14), opening out to the first side surface (22'); and
   the first set of abutment bars (24') comprises two abutment bars, located on opposite sides of the first side surface (22') with respect to a second median plane (M2) of the cutting insert (14) that extends through the first side surface (22') and through the through-bore (32).

4. The cutting insert (14) of claim 2, comprising two opposing minor surfaces (23), each minor surface (23) respectively extending between the first and second side surfaces (22', 22"), wherein the abutment bars of the first set of abutment bars (24') are elongated in shape, extend parallel to one another, and extend generally parallel to an axis (A), which is defined by an intersection of a first median plane (M1) extending through the two minor surfaces (23) and through the two end surfaces (16), and a second median plane (M2) extending through the first and second side surfaces (22', 22") and through the two end surfaces (16).

5. The cutting insert (14) of claim 1, wherein the abutment bars of the first set of abutment bars (24') are bound by the background surface (25), do not extend along the whole of the first side surface (22'), and do not intersect any edge of the first side surface (22').

6. The cutting insert (14) of claim 2, wherein the background surfaces (25) of the first and second side surfaces (22', 22") are generally concave.

7. The cutting insert (14) of claim 1, wherein:
   the cutting insert (14) is double-sided, the peripheral surface (20) further comprising:
      a second side surface (22") identical to the first side surface (22'), located opposite thereto, and comprising a second set of abutment bars (24") and a respective background surface (25); and
      two opposing minor surfaces (23), each minor surface (23) extending between the first and second side surfaces (22', 22");
   the first and second side surfaces (22', 22") are larger in area than the remaining surfaces of the cutting insert (14);
   the cutting insert (14) comprises a through-bore (32) for receiving a securing component (15) therein, wherein the through-bore (32) opens out to the first and second side surfaces (22', 22");
   each of the first and second sets of abutment bars (24', 24") comprises two elongated abutment bars, located on opposite sides of the respective side surface (22', 22") with respect to the through-bore (32);

the abutment bars of the first and second sets of abutment bars (24', 24") extend parallel to one another, and extend generally parallel to an axis (A), wherein:

the axis (A) is defined by an intersection of a first median plane (M1), which extends through the two minor surfaces (23) and through the two end surfaces (16), and a second median plane (M2), which extends through the first and second side surfaces (22', 22") and through the two end surfaces (16);

the background surfaces (25) are generally concave; and each abutment bar of the first and second sets of abutment bars (24', 24") is bound by the respective background surface (25), does not extend all the way to any edge of the respective side surface (22), and does not intersect any cutting edge (18') of the cutting insert (14).

8. The cutting insert (14) of claim 1, wherein the first side surface (22') has exactly two abutment bars (24') extending thereon.

9. A cutting tool (11), comprising:

at least a cutting portion (10) formed at an end thereof, the cutting portion (10) comprising an insert pocket (12) having a cutting insert (14) releasably retained therein;

the cutting insert (14) comprising two end surfaces (16), and a peripheral surface (20) extending therebetween, the peripheral surface (20) and the end surfaces (16) meeting at respective edges (18), at least a section of which forms respective cutting edges (18'), the peripheral surface (20) comprising at least a first side surface (22'); wherein:

the first side surface (22') comprises a first set of abutment bars (24') extending thereon and protruding outwardly with respect to a background surface (25) of the first side surface (22');

the abutment bars (24') are spaced apart from said respective edges (18) where the peripheral surface (20) meets the end surfaces (16); and each bar of the first set of abutment bars (24') comprises a respective outer surface (26') that engages a supporting major wall (28) of the insert pocket (12); and the outer surfaces (26') are the only portions of the first side surface (22') that engage the major wall (28).

10. The cutting tool (11) of claim 9, wherein the outer surfaces (26') are coplanar and define an imaginary plane (P) that does not intersect any portion of the first side surface (22') apart from the outer surfaces (26').

11. The cutting tool (11) of claim 9, wherein
the cutting insert (14) is a double-sided cutting insert (14), the peripheral surface (20) comprising a second side surface (22") located opposite the first side surface (22') and identical thereto; the second side surface (22") comprising a second set of abutment bars (24") extending therealong and protruding with respect to a background surface (25) of the second side surface (22"); and during a cutting operation, no abutment bar of the second set of abutment bars (24") interferes with the cutting operation.

12. The cutting tool (11) of claim 9, wherein a through-bore (32) for receiving a securing component (15) therein opens out to the first side surface (22'), and the first set of abutment bars (24') comprises two abutment bars that are located on opposite sides of the first side surface (22') with respect to the through-bore (32).

13. The cutting tool (11) of claim 11, wherein the abutment bars of the first and second sets of abutment bars (24', 24") extend mutually parallel to one another, and extend generally parallel to an axis (A), the axis defined by an intersection of a first median plane (M1) of the cutting insert (14) extending through the two minor surfaces (23) and through the two end surfaces (16), and a second median plane (M2) of the cutting insert (14) extending through the first and second side surfaces (22', 22") and through the two end surfaces (16).

14. The cutting tool (11) of claim 11, wherein the background surfaces (25) of the first and second side surfaces (22', 22") are generally concave.

15. The cutting tool (11) of claim 9, wherein:

the cutting insert (14) is double-sided, the peripheral surface (20) further comprising:

a second side surface (22") identical to the first side surface (22'), located opposite thereto, and comprising a second set of abutment bars (24") and a respective background surface (25); and two opposing minor surfaces (23) extending between the two side surfaces (22);

the cutting insert (14) is a tangential cutting insert (14), wherein the first and second side surfaces (22', 22") are larger in area than the remaining surfaces of the cutting insert (14);

the cutting insert (14) comprises a through-bore (32) for receiving a securing component (15) therein, wherein the through-bore (32) opens out to the first and second side surfaces (22', 22");

each of the first and second sets of abutment bars (24', 24") comprises two elongated bars, located on opposite sides of a respective side surface (22) with respect to the through-bore (32);

the abutment bars of the first and second sets of abutment bars (24', 24") extend mutually parallel to one another, and extend generally parallel to an axis (A), wherein
the axis (A) is defined by an intersection of a first median plane (M1) extending through the two minor surfaces (23) and through the two end surfaces (16), and a second median plane (M2) extending through the first and second side surfaces (22', 22") and through the two end surfaces (16);

the background surfaces (25) of the first and second side surfaces (22', 22") are generally concave; and each abutment bar of the first and second sets of abutment bars (24', 24") is surrounded by the respective background surface (25), does not extend all the way to any edge of the respective side surface (22), and does not intersect any cutting edge (18') of the cutting insert (14).

16. The cutting tool (11) of claim 9, wherein the cutting insert's first side surface (22') has exactly two abutment bars (24') extending thereon.

17. A cutting insert (14) comprising:

two opposing end surfaces (16);

a peripheral surface (20) extending between the two end surfaces, the peripheral surface (20) comprising opposing first and second side surfaces (22', 22") and opposing minor surfaces (23) extending between the side surfaces; and a first median plane (M1) extending through the two minor surfaces (23) and through the two end surfaces (16), wherein:

each of the first and second side surfaces comprises a set of abutment bars (24', 24") extending thereon and protruding outwardly with respect to a background surface (25) of that side surface, each abutment bar comprising a respective outer surface (26', 26"), the outer surfaces associated with a given side surface being generally coplanar and defining an imaginary plane (P1, P2) which is parallel to the first median plane (M1), in an end view, the entire cutting insert is located between the imaginary planes (P1, P2);

the abutment bars are elongated in shape, extend parallel to one another, and extend generally parallel to an axis (A) which is defined by an intersection of the first median plane (M1) with a second median plane (M2) extending through the first and second side surfaces (22', 22") and through the two end surfaces (16);

the abutment bars are bound by the background surface of a respective side surface;

the abutment bars do not extend along the whole of said respective side surface;

the abutment bars do not intersect any edge of said respective side surface; and the abutment bars are offset from one another in a direction along the axis (A).

18. The cutting insert (14) of claim 17, wherein:

the background surfaces (25) of the first and second side surfaces (22', 22") are generally concave.

19. The cutting insert (14) of claim 17, wherein:

the first and second side surfaces (22', 22") are larger in area than the remaining surfaces of the cutting insert (14);

the cutting insert (14) comprises a through-bore (32) which opens out to the first and second side surfaces (22', 22");

each of the first and second sets of abutment bars (24', 24") comprises two elongated abutment bars, located on opposite sides of the respective side surface (22', 22") with respect to the through-bore (32); and the background surfaces (25) are generally concave.

20. A cutting tool (11) comprising:

a cutting portion (10) comprising an insert pocket (12); and a cutting insert (14) in accordance with claim 15 seated in the insert pocket; wherein:

one side surface (22', 22") of the insert abuts a major wall (28) of the insert pocket, and the outer surfaces (26', 26") of the abutment bars (24', 24") associated with said one side surface are the only surfaces in engagement with the major wall.

21. A double-sided cutting insert (14), comprising:

two opposing end surfaces (16) and a peripheral surface (20) extending therebetween, the peripheral surface (20) and the end surfaces (16) meeting at respective edges (18), at least a section of which forms respective cutting edges (18') with a rake surface being formed on the end surface (16), the peripheral surface (20) comprising a first side surface (22') and a second side surface (22"), located opposite the first side surface (22') and identical thereto; wherein:

the first side surface (22') comprises a first set of abutment bars (24') extending thereon and protruding outwardly with respect to a background surface (25) of the first side surface (22'), each abutment bar of the first set of abutment bars (24') comprising a respective outer surface (26') for engaging a major wall (28) of an insert pocket (12) that releasably retains the cutting insert (14) therein;

the outer surfaces (26') are generally coplanar and define an imaginary plane (P1) that does not intersect any portion of the first side surface (22') apart from the outer surfaces (26'); and the abutment bars (24') are devoid of cutting edges (18').

* * * * *